UNITED STATES PATENT OFFICE.

JOHN ATWOOD, JR., OF PROVINCETOWN, MASSACHUSETTS.

IMPROVED PROCESS OF CURING AND PUTTING UP FISH.

Specification forming part of Letters Patent No. 90,334, dated May 25, 1869.

*To all whom it may concern:*

Be it known that I, JOHN ATWOOD, Jr., of Provincetown, county of Barnstable and State of Massachusetts, have invented a new and Improved Process for Curing and Putting up Fish, and that the following is a full, clear, and exact description thereof.

The object of my invention is to produce a wholesome article of food, in the nature of prepared fish, that shall be reasonable in price, convenient for cooking, and free from offensive odor.

The old method of drying fish is well known, and is open to many apparent objections. The new method of preparing fish by desiccation is so expensive as to make the price of the article to consumers a serious objection to this method.

The cause of ordinarily-cured fish having an offensive odor at all times, but more especially when the atmosphere is moist, is the mucous membrane between the skin and the flesh, which, when dried and afterward moistened, becomes slimy and offensive. This is peculiar to the old method of curing and bundling fish.

My method of preparing fish is particularly applicable to cod and haddock.

My process is as follows: When the fish is fresh, I take out the principal bones and fins, the fish remaining whole or split in halves. When partially dried and cured with salt I remove the skin, and with it the entire mucous membrane the cause of the offensive odor of salt fish. I then pack in light wood boxes, of convenient size—for instance, from ten to one hundred pound boxes.

Fish prepared after this method is white, clean, and sweet, and will keep for any length of time. It will not dry up and lose its flavor, like the desiccated article, but remains moist, and keeps the palatable flavor of freshly-cured fish. It can be freshened for the table in a very few minutes, and can be brought on whole, as it is often desired to do. This cannot be done by fish cured by the old method, nor by any other modern process.

This article can be furnished at one-half the cost of desiccated fish.

What I claim as my invention, and desire to secure by Letters Patent, is—

The method or process for curing and putting up fish, substantially as herein described.

In testimony whereof I have signed my name to this specification in the presence of two subscribing witnesses.

JOHN ATWOOD, JR.

Witnesses:
CARROLL D. WRIGHT,
AUSTIN S. HOWARTH.